UNITED STATES PATENT OFFICE.

EUGENE McCARTHY, OF SACRAMENTO, CALIFORNIA.

PROCESS OF CLEANING THE SURFACES OF STONE.

SPECIFICATION forming part of Letters Patent No. 370,551, dated September 27, 1887.

Application filed April 4, 1887. Serial No. 233,654. (No specimens.)

*To all whom it may concern:*

Be it known that I, EUGENE MCCARTHY, of Sacramento, Sacramento county, State of California, have invented an Improvement in Processes of Cleaning Marble, Granite, Limestone, &c.; and I hereby declare the following to be a full, clear, and exact description of the same.

My invention relates to the cleaning of marble, granite, limestone, &c., and removing stains, rust, and other impurities therefrom; and my invention consists in the employment and application of certain compounds and compositions, as I shall now fully describe.

In carrying out my process I first take hydrochloric acid, eight pounds; carbolic acid, eight pounds; vinegar, two gallons. These I mix, and then apply the mixture to the stone with a sponge or brush, and allow the stone to remain untouched for about thirty minutes. I then take oxalic acid, eight pounds; chloride of lime, five pounds. These I triturate and dissolve with six gallons of water. Then I apply the mixture to the stone with a sponge or brush and allow it to remain for about twenty minutes. Then I wash the stone with soap and water. Then I take precipitated chalk, one pound, and flour of putty, one pound, and mix them together with one gallon of vinegar. This mixture I then apply to the stone in similar manner. All the applications are well rubbed in, and when the process is complete it will be found that all stains, rust, &c., have been removed, and the stone is well cleaned without suffering the least injury.

I am aware of the use of chloride of lime and of hydrochloric acid, and also of oxalic acid for this purpose; but I am not aware that the process is carried out by the successive applications of the compositions described has ever been employed.

Having thus described my invention, what I claim as new, and desire to secure by Letters Patent, is—

The process of cleaning marble, granite, limestone, and other stones, which consists in first applying a mixture of hydrochloric acid, carbolic acid, and vinegar, then after the lapse of an interval applying a mixture of oxalic acid, chloride of lime, and water, then washing the stone, and finally in applying a mixture in vinegar of precipitated chalk and flour of putty, substantially as herein described.

In witness whereof I have hereunto set my hand.

EUGENE McCARTHY.

Witnesses:
LOUIS S. CRACKBON,
THOMAS BYRNE.